(12) United States Patent
Okabe et al.

(10) Patent No.: US 7,343,926 B2
(45) Date of Patent: Mar. 18, 2008

(54) LIQUID RAW MATERIAL SUPPLY UNIT FOR VAPORIZER

(75) Inventors: Tsuneyuki Okabe, Oshu (JP); Shigeyuki Okura, Nirasaki (JP); Hiroki Doi, Komaki (JP); Minoru Ito, Komaki (JP); Yoji Mori, Komaki (JP); Yasunori Nishimura, Komaki (JP)

(73) Assignees: CKD Corporation, Komaki (JP); Tokyo Electron Limited, Tokyo (JP)

( * ) Notice: Subject to any disclaimer, the term of this patent is extended or adjusted under 35 U.S.C. 154(b) by 0 days.

(21) Appl. No.: 11/812,051

(22) Filed: Jun. 14, 2007

(65) Prior Publication Data

US 2007/0295405 A1 Dec. 27, 2007

(30) Foreign Application Priority Data

Jun. 23, 2006 (JP) ............................. 2006-174323

(51) Int. Cl.
*F16K 51/00* (2006.01)
(52) U.S. Cl. ...................................... 137/240; 137/884
(58) Field of Classification Search ................ 137/240, 137/884
See application file for complete search history.

(56) References Cited

U.S. PATENT DOCUMENTS

| 5,819,782 | A  | * | 10/1998 | Itafuji ........................ 137/884 |
| 6,209,571 | B1 | * | 4/2001  | Itoh et al. ................... 137/240 |
| 6,314,986 | B1 | * | 11/2001 | Zheng et al. ................. 137/884 |
| 6,715,507 | B2 | * | 4/2004  | Arai et al. ................... 137/240 |

FOREIGN PATENT DOCUMENTS

JP A 2004-186338 7/2004

* cited by examiner

*Primary Examiner*—Kevin Lee
(74) *Attorney, Agent, or Firm*—Oliff & Berridge, PLC (57) ABSTRACT

A liquid raw material supply unit for a vaporizer is adapted to supply a liquid raw material to the vaporizer that vaporizes the liquid raw material. The unit comprises: a manifold internally formed with a flow passage; and a plurality of fluid control valves mounted on the manifold, wherein the plurality of fluid control valves includes: a liquid raw material control valve for controlling supply of the liquid raw material to the flow passage; a cleaning solution control valve for controlling supply of a cleaning solution to the flow passage; a purge gas control valve for controlling supply of a purge gas to the flow passage; and a first introducing control valve connectable to the vaporizer for controlling supply of a fluid from the flow passage to the vaporizer, the purge gas control valve, the cleaning solution control valve, the liquid raw material control valve, and the first introducing control valve being mounted on the manifold in this order from an upstream side of the manifold, wherein the flow passage is connected to valve ports of the plurality of control valves respectively, the valve ports communicating with valve openings of the respective control valves, and the flow passage is configured to allow the purge gas supplied from the purge gas control valve to directly flow in the valve ports of the cleaning solution control valve and the liquid raw material control valve placed downstream from the purge gas control valve.

7 Claims, 7 Drawing Sheets

LIQUID RAW MATERIAL SUPPLY UNIT FOR VAPORIZER

BACKGROUND OF THE INVENTION

1. Field of the Invention

The present invention relates to a liquid raw material supply unit for a vaporizer for supplying a liquid raw material to the vaporizer.

2. Description of Related Art

In recent years, a high-integration design has been demanded for semiconductor memory devices and embedded memory LSIs using capacitors such as DRAM (Dynamic Random Access Memory) and FeRAM (Ferroelectric Random Access Memory). In response to such demands, high dielectric constant materials have to be used for manufacture of semiconductors. The high-dielectric materials are often used in liquid state. In many cases, accordingly, a liquid raw material is supplied to a vaporizer in which the liquid raw material is vaporized, and this vaporized gas is supplied to a reactor. This process therefore needs a liquid raw material supply line for supplying the liquid raw materials to the vaporizer.

If the liquid raw material remains in the liquid raw material line and the vaporizer, it may result in reaction products which will be deposited in the line and the vaporizer. Such deposits are likely to cause various problems; e.g., they become a particle generation source, leading to a lower yield ratio, they clog control valves and line pipes, or they clog nozzles of the vaporizer. To avoid those problems, the liquid raw material supply line is usually subjected to a cleaning process after supply of the liquid raw material to the vaporizer. In the cleaning process, the liquid raw material remaining in the line pipes and the vaporizer is cleaned or washed with a cleaning solution (by liquid-liquid replacement) and then the cleaning solution is removed from the line pipes and the vaporizer by a purge gas (by liquid-gas replacement).

Figure 6:
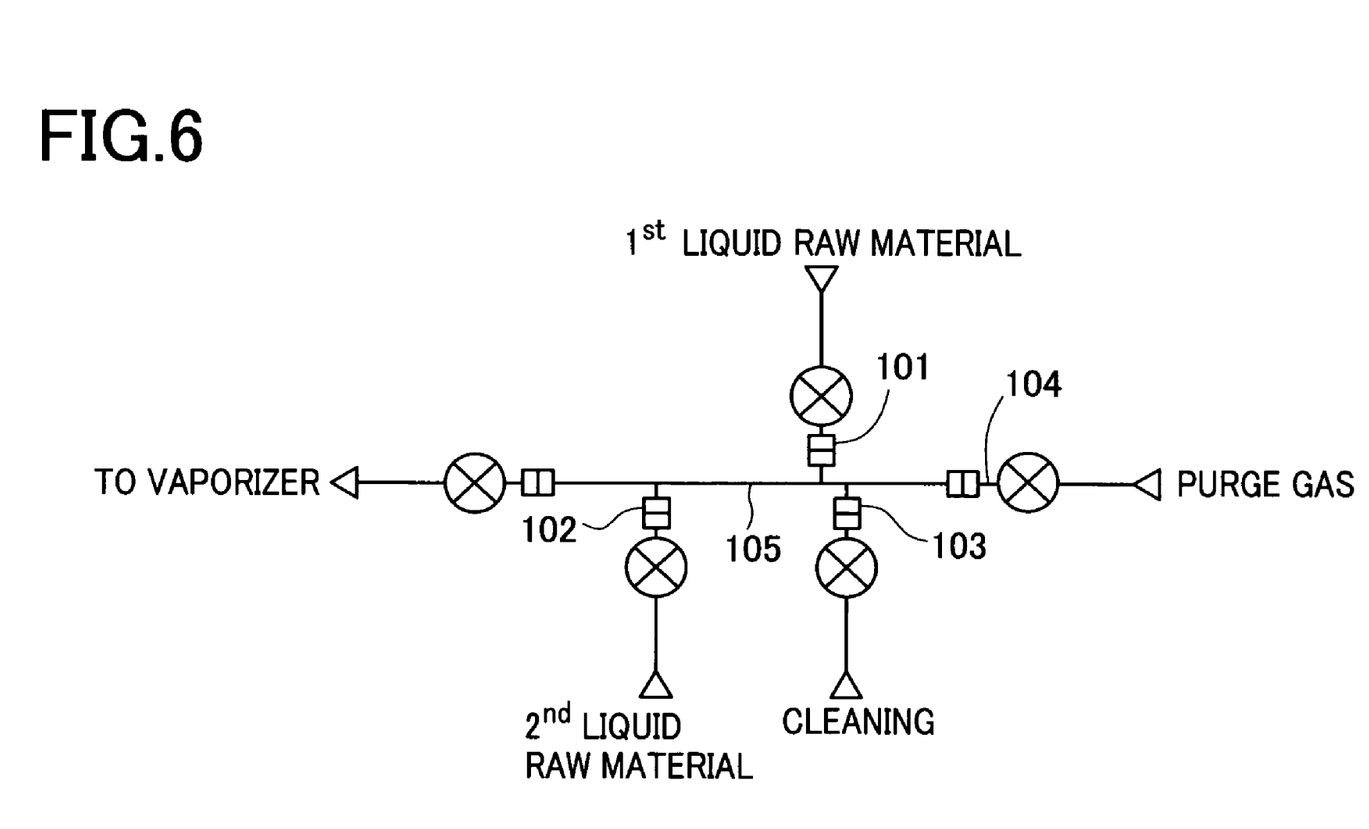
FIG. 6 is a schematic diagram of a structural outline of a liquid raw material supply line in a prior art.

An example of the above liquid raw material supply line is arranged as shown in FIG. 6 that liquid raw material lines 101 and 102 each comprising a valve and pipes for feeding a liquid raw material and a cleaning solution line 103 comprising a valve and pipes for feeding a cleaning solution are connected to a main line 105 with one end connected to a vaporizer and the other end connected to a purge gas line 104. In this liquid raw material line, a liquid raw material is fed from the liquid raw material line 101 or 102 to the main line 105, and the liquid raw material fed into the main line 105 is then supplied to the vaporizer.

For cleaning, here, the cleaning solution is fed from the cleaning solution line 103 to the main line 105, thereby cleaning the line and the vaporizer through which the liquid raw material has passed with the cleaning solution. After cleaning using the cleaning solution, a purge gas is introduced into the purge gas line 104 to thereby remove the remaining cleaning solution from the liquid raw material supply line.

Figure 7:
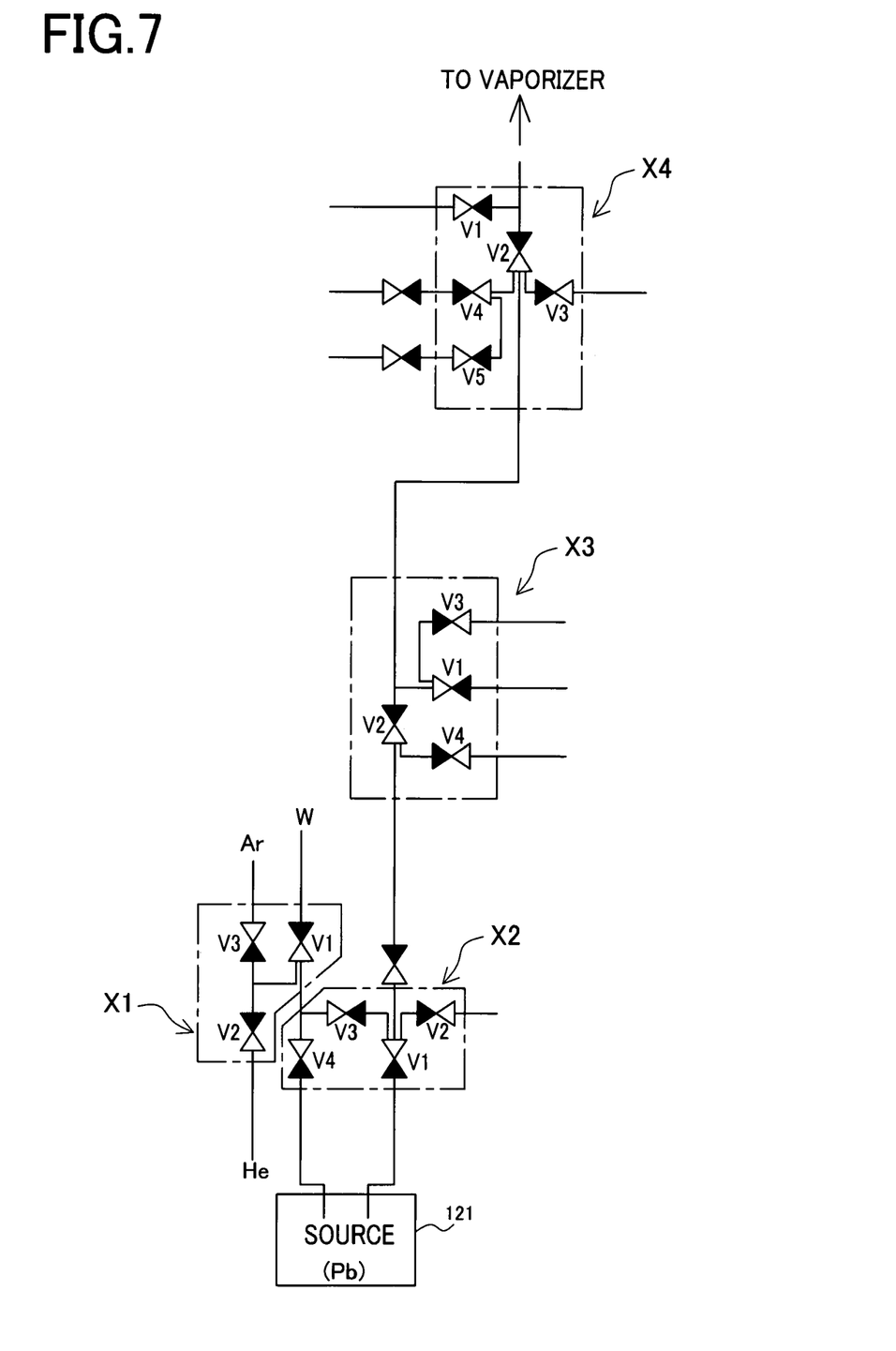
FIG. 7 is a schematic diagram of a structural outline of a liquid raw material supply line in another prior art.

Another example of the liquid raw material supply line is shown in FIG. 7, which is arranged such that monoblock valves X1 to X4 each comprising a plurality of valves are connected to each other through pipes. In this liquid raw material supply unit, a pressurizing gas (e.g., He gas or another inert gas) is fed into a valve V2 of the monoblock valve X1 and then enters a liquid raw material tank 121 through a valve V1 of the monoblock valve X1 and a valve V4 of the monoblock valve X2 to pressurize the liquid raw material to be supplied to the vaporizer through the valve V1 of the monoblock valve X2, and the monoblock valves X3 and X4 in order.

For cleaning, here, when a washing solution is fed into the valve V1 of the monoblock valve X1, the washing solution flows in the monoblock valve X3 via a valve V3 of the monoblock valve X2. The washing solution then flows in a valve V2 of the monoblock valve X3 and a valve V2 of the monoblock valve X4 sequentially. By this process, the passages through which the liquid raw material has passed are cleaned. After cleaning using the washing solution, an inert gas such as an Ar gas is introduced as a purge gas into a valve V3 of the monoblock X1 to remove the remaining washing solution from the passages.

However, both the aforementioned liquid raw material supply lines are fundamentally constructed of a plurality of valves and a plurality of pipes. This construction disadvantageously needs a large mounting space, which could impede miniaturization and high integration.

In the former liquid raw material line, when the cleaning solution is fed into the main line 105 for cleaning, a liquid remaining or staying zone (a dead space) tends to occur in the liquid raw material supply line 101 or 102. When the purge gas is fed into the main line 105, on the other hand, a liquid remaining or staying zone (a dead space) is likely to occur in the liquid raw material supply lines 101 and 102 and the cleaning solution supply line 103 respectively. Thus, a replacement rate (or replacement capability) of the residual or remaining liquid (a liquid-liquid replacement rate and a liquid-gas replacement rate) is poor, which needs much time for replacement of the residual liquid, resulting in a longer cleaning time. This also leads to a prolonged cycle time of a semiconductor manufacturing device and hence a lower manufacturing efficiency. Further, the liquid-gas replacement rate is extremely poor with the result that the cleaning solution remaining after cleaning could not be replaced completely by the purge gas.

In the latter liquid raw material supply line, on the other hand, the time required for cleaning could be shortened (the replacement rate of the residual liquid could be enhanced). However, the monoblock valves X1 to X4 used in the line have very complicated flow passages respectively.

BRIEF SUMMARY OF THE INVENTION

The present invention has been made in view of the above circumstances and has an object to provide a liquid raw material supply unit in a miniaturized and integrated design with simple passage configurations, capable of reducing liquid remaining or staying zones, thereby enhancing a replacement rate of residual liquid.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the above object, the present invention provides a liquid raw material supply unit for a vaporizer, adapted to supply a liquid raw material to the vaporizer that vaporizes the liquid raw material, the unit comprising: a manifold internally formed with a flow passage; and a plurality of fluid control valves mounted on the manifold, wherein the plurality of fluid control valves includes: a liquid raw material control valve for controlling supply of the liquid raw material to the flow passage; a cleaning solution control valve for controlling supply of a cleaning solution to the flow passage; a purge gas control valve for controlling supply of a purge gas to the flow passage; and a first introducing control valve connectable to the vaporizer for controlling supply of a fluid from the flow passage to the vaporizer, the purge gas control valve, the cleaning solution control valve, the liquid raw material control valve, and the first introducing control valve being mounted on the manifold in this order from an upstream side of the manifold, wherein the flow passage is connected to valve ports of the plurality of control valves respectively, the valve ports communicating with valve openings of the respective control valves, and the flow passage is configured to allow the purge gas supplied from the purge gas control valve to directly flow in the valve ports of the cleaning solution control valve and the liquid raw material control valve placed downstream from the purge gas control valve.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

Figure 1:
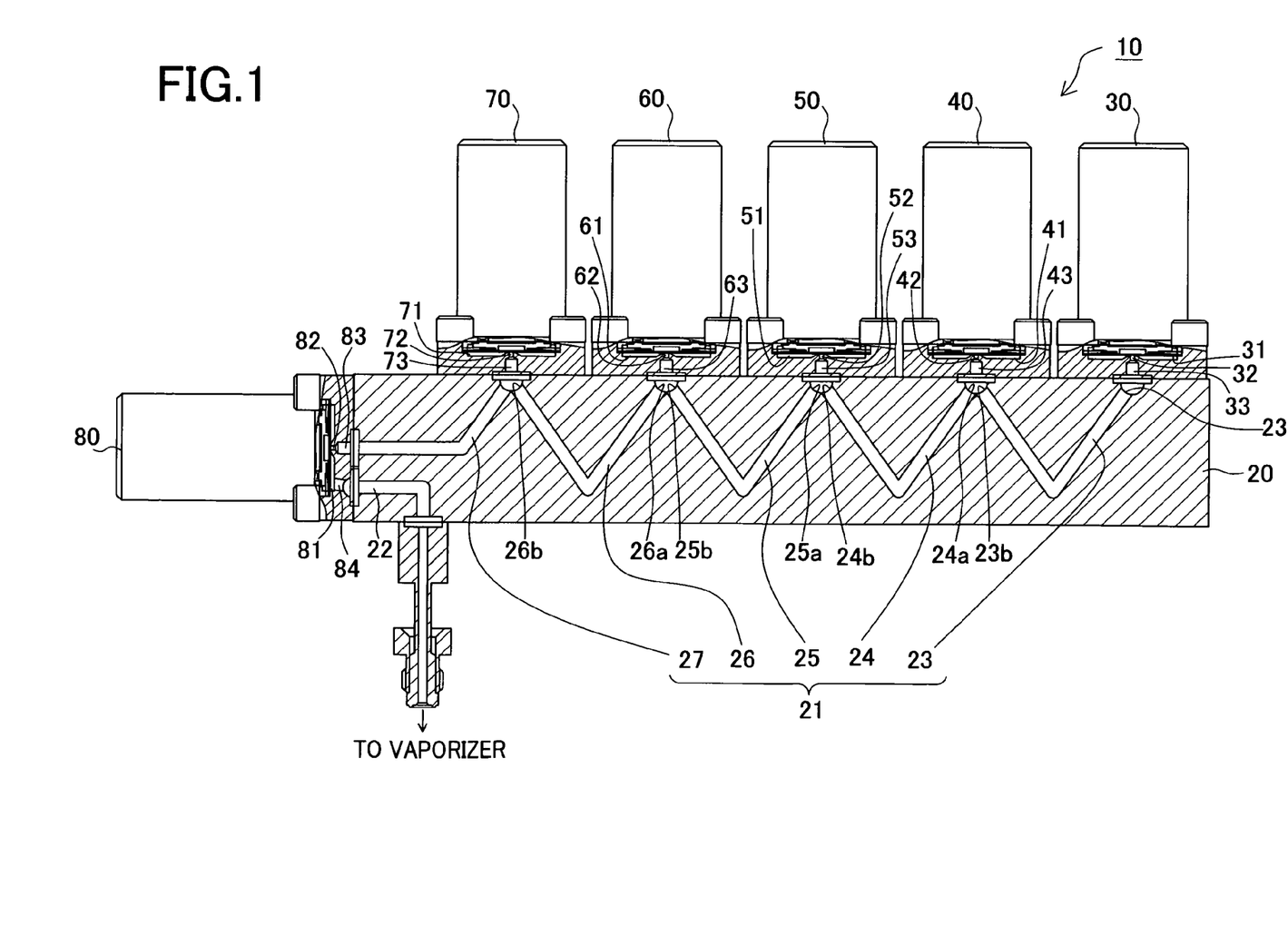
FIG. 1 is a partially sectional view showing a schematic configuration of a liquid raw material supply unit in a preferred embodiment.

A detailed description of a preferred embodiment of a liquid raw material supply unit for a vaporizer according to the present invention will now be given referring to the accompanying drawings. The configuration of the liquid raw material supply unit of the present embodiment will be explained referring to FIG. 1. FIG. 1 is a partially sectional view showing a schematic configuration of the liquid raw material supply unit of the present embodiment.

The liquid raw material supply unit 10 includes a purge gas supply valve 30, a cleaning solution supply valve 40, a first liquid raw material supply valve 50, a second liquid raw material supply valve 60, and an introducing valve 70 connectable to a drain (hereinafter, referred to as a "drain introducing valve", which corresponds to a second introducing valve of the present invention), which are fixedly mounted in line on the upper surface of a manifold 20 internally formed with flow passages, as shown in FIG. 1. Further, an introducing valve 80 connectable a vaporizer (hereinafter, referred to as a "vaporizer introducing valve", which corresponds to a first introducing valve of the present invention) is attached to the left side of the manifold 20. Specifically, the purge gas supply valve 30, the cleaning solution supply valve 40, the first liquid raw material supply valve 50, the second liquid raw material supply valve 60, the drain introducing valve 70, and the vaporizer introducing valve 80 are arranged in this order from the upstream side of the manifold 20. Through a flow passage 21 formed in the manifold 20, the purge gas supply valve 30, the cleaning solution supply valve 40, the first liquid raw material supply valve 50, the second liquid raw material supply valve 60, the drain introducing valve 70, and the vaporizer introducing valve 80 are connected to one another. The flow passage 21 includes V-shaped passages 23, 24, 25, and 26, and a communication passage 27. Through a flow passage 22 of the manifold 20, the vaporizer introducing valve 80 is connected to a vaporizer.

The liquid raw material supply unit 10 is constructed to perform supply of a first liquid raw material and a second liquid raw material to the vaporizer, cleaning of the unit 10 and the vaporizer with a cleaning solution after the supplying of the first and second liquid raw materials, and removal of residual cleaning solution or others by a purge gas after the cleaning. The liquid raw material supply unit 10 comprising the valves 30, 40, 50, 60, 70, and 80 that are mounted on the manifold 20 can achieve miniaturization and high integration. Accordingly, the liquid raw material supply unit 10 can be installed close to the vaporizer.

The purge gas supply valve 30 is configured to control supply of a purge gas (a nitrogen gas in the present embodiment) to the flow passage 21 of the manifold 20. In the purge gas supply valve 30, a valve chamber 31 is connected to a purge gas supply source through a valve chamber port not shown and also connected to the flow passage 21 of the manifold 20 through a valve opening 32 and a valve port 33 opening on a mounting surface (a lower surface).

The cleaning solution supply valve 40 is configured to control supply of the cleaning solution (THF in the present embodiment) to the flow passage 21 of the manifold 20. In the cleaning solution supply valve 40, a valve chamber 41 is connected to a cleaning solution supply source through a valve chamber port not shown and also connected to the flow passage 21 of the manifold 20 through a valve opening 42 and a valve port 43 opening on a mounting surface (a lower surface).

The first liquid raw material supply valve 50 is configured to control supply of the first liquid raw material (strontium in the present embodiment) to the flow passage 21 of the manifold 20. In the first liquid raw material supply valve 50, a valve chamber 51 is connected to a first liquid raw material supply source through a valve chamber port not shown and also connected to the flow passage 21 of the manifold 20 through a valve opening 52 and a valve port 53 opening on a mounting surface (a lower surface).

The second liquid raw material supply valve 60 is configured to control supply of the second liquid raw material (titanium in the present embodiment) to the flow passage 21 of the manifold 20. In the second liquid raw material supply valve 60, a valve chamber 61 is connected to a second liquid raw material supply source through a valve chamber port not shown and also connected to the flow passage 21 of the manifold 20 through a valve opening 62 and a valve port 63 opening on a mounting surface (a lower surface).

The drain introducing valve 70 is configured to control introduction of a fluid flowing through the flow passage 21 of the manifold 20 into a drain for discharging the fluid from the liquid raw material supply unit 10. In the drain introducing valve 70, a valve chamber 71 is connected to the drain through a valve chamber port not shown and also connected to the flow passage 21 of the manifold 20 through a valve opening 72 and a valve port 73 opening on a mounting surface (a lower surface).

The vaporizer introducing valve 80 is configured to control supply of a fluid flowing through the flow passage 21 of the manifold 20 to the vaporizer. In the vaporizer introducing valve 80, a valve port 83 opening on a mounting surface (a right surface) and communicating with a valve opening 82 is connected to the flow passage 21 of the manifold 20, and a valve chamber port 84 communicating with a valve chamber 81 is connected the flow passage 22.

Here, the purge gas supply valve 30, the cleaning solution supply valve 40, the first liquid raw material supply valve 50, the second liquid raw material supply valve 60, and the drain introducing valve 70 are connected to one another through the flow passage 21 of the manifold 20. To be more specific, adjacent valves, that is, the purge gas supply valve 30 and the cleaning solution supply valve 40, the cleaning solution supply valve 40 and the first liquid raw material supply valve 50, the first liquid raw material supply valve 50 and the second liquid raw material supply valve 60, and the second liquid raw material supply valve 60 and the drain introducing valve 70, are connected through the corresponding V-shaped passages 23, 24, 25, and 26 respectively.

More specifically, inlets 23a to 26a and outlets 23b to 26b of the V-shaped passages 23 to 26 are formed opening on the upper surface of the manifold 20 in such a manner as to communicate with the valve ports 33, 43, 53, 63, and 73 of the valves 30, 40, 50, 60, and 70 respectively. In other words, the inlet 23a of the V-shaped passage 23 is connected to the valve port 33 of the purge gas supply valve 30 while the outlet 23b is connected to the valve port 43 of the cleaning solution supply valve 40. The inlet 24a of the V-shaped passage 24 is connected to the valve port 43 of the cleaning solution supply valve 40 while the outlet 24b is connected to the valve port 53 of the first liquid raw material supply valve 50. Further, the inlet 25a of the V-shaped passage 25 is connected to valve port 53 of the first liquid raw material supply valve 50 while the outlet 25b is connected to the valve port 63 of the second liquid raw material supply valve 60. The inlet 26a of the V-shaped passage 26 is connected to the valve port 63 of the second liquid raw material supply valve 60 while the outlet 26b is connected to the valve port 73 of the drain introducing valve 70.

As above, the outlet 23b of the V-shaped passage 23 and the inlet 24a of the V-shaped passage 24 are formed to open at the same position to be connected to the valve port 43 of the cleaning solution supply valve 40. In other words, the V-shaped passages 23 and 24 are connected to each other at the outlet 23b (or the inlet 24a), i.e., at a joint portion with respect to the valve port 43. Further, the outlet 24b of the V-shaped passage 24 and the inlet 25a of the V-shaped passage 25 are formed to open at the same position to be connected to the valve port 53 of the first liquid raw material supply valve 50. In other words, the V-shaped passages 24 and 25 are connected to each other at the outlet 24b (or the inlet 25a), i.e., at a joint portion with respect to the valve port 53. The outlet 25b of the V-shaped passage 25 and the inlet 26a of the V-shaped passage 26 are formed to open at the same position to be connected to the valve port 63 of the second liquid raw material supply valve 60. In other words, the V-shaped passages 25 and 26 are connected to each other at the outlet 25b (or the inlet 26a), i.e., at a joint portion with respect to the valve port 63.

The valve port 73 of the drain introducing valve 70 and the valve port 83 of the vaporizer introducing valve 80 are connected through the communication passage 27. With the above configuration, a fluid to be supplied from each of the first liquid raw material supply valve 50, the second liquid raw material supply valve 60, the cleaning solution supply valve 40, and the purge gas supply valve 30 can be supplied to the vaporizer or discharged to the drain by control of the drain introducing valve 70 and the vaporizer introducing valve 80.

Operations of the aforementioned liquid raw material supply unit 10 will be explained below. When the first liquid raw material is to be supplied to the vaporizer, the first liquid raw material supply valve 50 and the vaporizer introducing valve 80 are opened while other valves 30, 40, 60, and 70 are closed. Thus, the first liquid raw material fed from the first liquid raw material supply valve 50 is allowed to pass through the flow passage 21, i.e., the V-shaped passages 25 and 26 and the communication passage 27 and flow in the vaporizer introducing valve 80. The vaporizer introducing valve 80 placed in an open state at this time allows the first liquid raw material flowing in the valve 80 to be supplied to the vaporizer through the flow passage 22.

When the second liquid raw material is to be supplied to the vaporizer, the second liquid raw material supply valve 60 and the vaporizer introducing valve 80 are opened while other valves 30, 40, 50, and 70 are closed. Thus, the second liquid raw material fed from the second liquid raw material supply valve 60 is allowed to pass through the flow passage 21, i.e., the V-shaped passage 26 and the communication passage 27 and flow in the vaporizer introducing valve 80. The vaporizer introducing valve 80 placed in the open state at this time allows the second liquid raw material flowing in the valve 80 to be supplied to the vaporizer through the flow passage 22.

For cleaning, the cleaning solution supply valve 40 and the vaporizer introducing valve 80 are opened while the other valves 30, 50, 60, and 70 are closed. Thus, the cleaning solution fed from the cleaning solution supply valve 40 is allowed to pass through the V-shaped passages 24, 25, 26 and the communication passage 27 and flow in the vaporizer introducing valve 80. The vaporizer introducing valve 80 placed in the open state at this time allows the cleaning solution flowing in the valve 80 to be supplied to the vaporizer through the flow passage 22. In this way, the cleaning solution is supplied to the passages, the valves, and the vaporizer through which the first or second liquid raw material has passed, thereby cleaning the liquid raw material supply unit 10 and the vaporizer.

When the cleaning solution is to be supplied, the valve ports 53, 63, and 73 may become liquid remaining zones (dead spaces), but respective volumes are extremely small as compared with a conventional case. The cleaning solution fed from the cleaning solution supply valve 40 to the V-shaped passage 24 flows in the valve port 53 of the first liquid raw material supply valve 50 and then in the V-shaped passage 25. The cleaning solution flowing in the V-shaped passage 25 flows in the valve port 63 of the second liquid raw material supply valve 60 and then in the V-shaped passage 26. The cleaning solution flowing in the V-shaped passage 26 flows in the valve port 73 of the drain introducing valve 70 and then in the communication passage 27. In the above way, the cleaning solution is directly allowed to flow in the valve ports 53, 63, and 73 which may become liquid remaining zones. Accordingly, the cleaning solution collides with the residual liquid staying in the valve ports 53, 63, and 73 sequentially to gradually push out the residual liquid from the valve ports 53, 63, and 73 or dissolve the residual liquid. This makes it possible to efficiently replace the residual liquid by the cleaning solution. Thus, the liquid-liquid replacement rate can be enhanced. Consequently, the first or second liquid raw material remaining in the flow passages of the liquid raw material supply unit 10 can completely be replaced by the cleaning solution in a shorter time than the conventional case.

Figure 2:
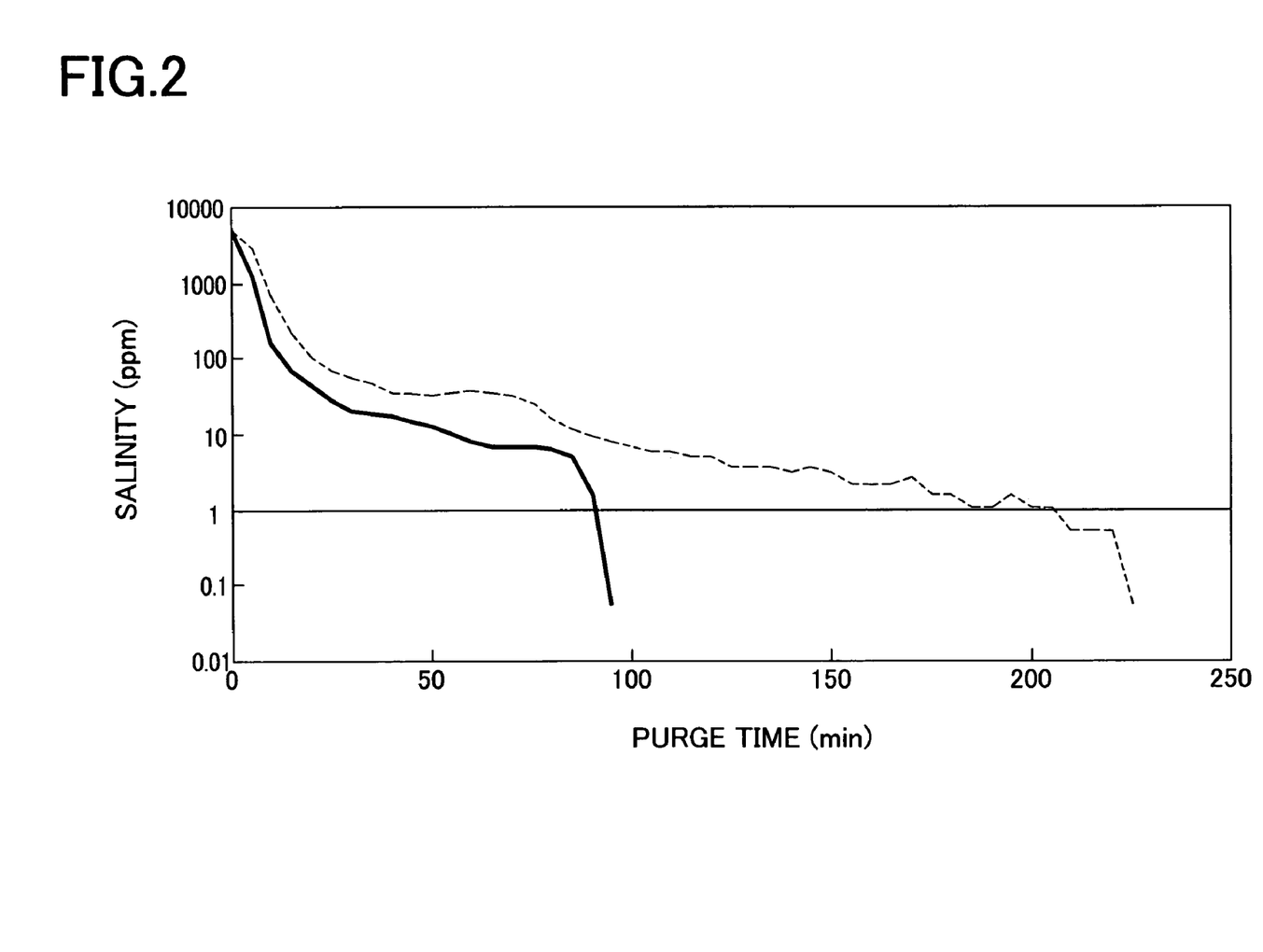
FIG. 2 is a graph showing test results of a liquid-liquid (salt water—pure water) replacement rate in the case where salt water is supplied from a first liquid raw material supply valve (line)
Figure 3:
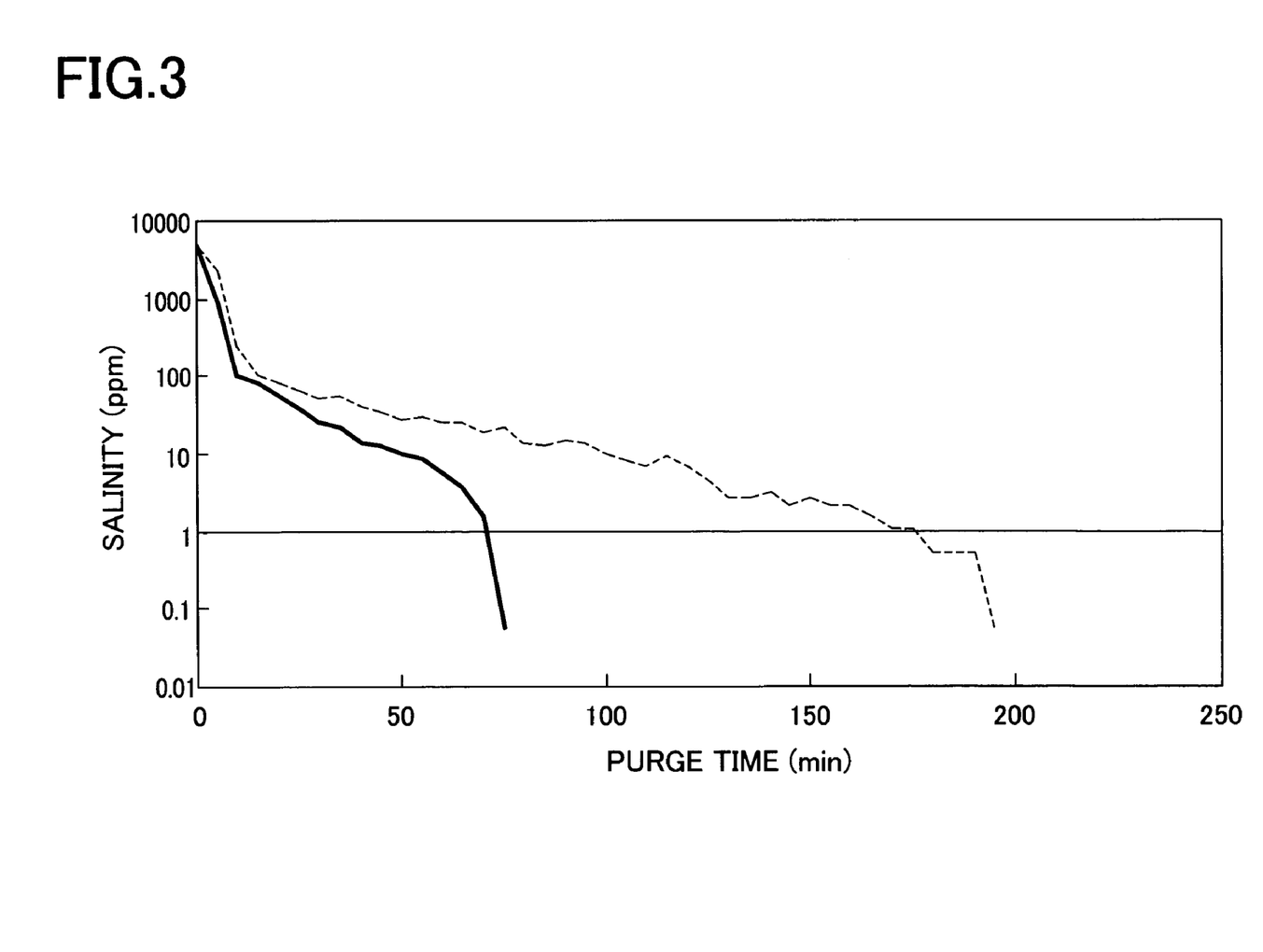
FIG. 3 is a graph showing test results of a liquid-liquid (salt water—pure water) replacement rate in the case where salt water is supplied from a second liquid raw material supply valve (line)

Test results of replacement rates of the liquid raw material supply unit 10 of the present embodiment and that of the conventional liquid raw material supply line shown in FIG. 6 are shown in FIGS. 2 and 3. FIG. 2 is a graph showing the test result of a liquid-liquid (salt water—pure water) replacement rate in the case where salt water is supplied from the first liquid raw material supply valve (line). FIG. 3 is a graph showing the test result of a liquid-liquid (salt water—pure water) replacement rate in the case where salt water is supplied from the second liquid raw material supply valve (line).

In the tests, salt water (0.5%) was filled in the flow passage instead of the liquid raw material and then pure water was supplied at a rate of 2 mL/min. Then, water discharged from the supply unit 10 and the conventional supply line through respective supply ports connectable with the vaporizers, was stored by 10 mL, and electric conductivity of the stored water was measured. Based on the previously measured electric conductivity of each of pure water and salt water, the salinity was calculated from the measured electric conductivity. In the tests, the salinity was compared between the both cases until the salt water was diluted to the salinity of 1.0 ppm or below.

In a comparison between the liquid raw material supply unit 10 and the conventional liquid raw material supply line of FIG. 6 in regard to a replacement time needed for replacement until the salinity was reduced to 1.0 ppm, as clearly found in FIGS. 2 and 3, the liquid raw material supply unit 10 of the present embodiment (a solid line in the graph) shows a superior replacement rate to the conventional liquid raw material supply line (a dotted line in the graph). Specifically, in the case where the salt water was supplied from the first liquid raw material supply line (valve), the replacement time needed until the salinity was reduced to 1.0 ppm was about 90 min. in the liquid raw material supply unit 10, whereas it was as much as about 220 min. in the conventional liquid raw material supply line, as shown in FIG. 2. In the case where the salt water was supplied from the second liquid raw material supply line (valve), the replacement time needed until the salinity was reduced to 1.0 pm was about 70 min. in the liquid raw material supply unit 10, whereas it was as much as about 170 min. in the conventional liquid raw material supply line.

The above results reveal that the liquid raw material supply unit 10 of the present embodiment can largely shorten a cleaning time needed for cleaning the liquid raw material supply unit 10, resulting in a shortened cycle time of a semiconductor manufacturing device, thereby improving production capacity. A consumption amount of the cleaning solution can also be reduced for cutting on costs.

After completion of the cleaning using the cleaning solution as above, the purge gas supply valve 30 and the drain introducing valve 70 are opened and other valves 40, 50, 60, and 80 are closed. Thus, the supply of the cleaning solution from the cleaning solution supply valve 40 is stopped while supply of a purge gas from the purge gas supply valve 30 is started. The purge gas supplied from the purge gas supply valve 30 is discharged from the liquid raw material supply unit 10 via the drain introducing valve 70. Such supply of the purge gas is intended to completely remove the residual liquid from the liquid raw material supply unit 10 to prevent possible corrosion or other disadvantages. In some instances, the drain introducing valve 70 is closed and the vaporizer introducing valve 80 is opened to supply the purge gas to the vaporizer.

When the purge gas is to be supplied, similarly, the valve ports 43, 53, and 63 may become liquid remaining zones (dead spaces), but respective volumes are extremely small as compared with the conventional case. The purge gas supplied from the purge gas supply valve 30 into the V-shaped passage 23 flows in the valve port 43 of the cleaning solution supply valve 40 and then in the V-shaped passage 24. The purge gas introduced into the V-shaped passage 24 flows in the valve port 53 of the first liquid raw material supply valve 50 and then in the V-shaped passage 25. The purge gas flowing in the V-shaped passage 25 then flows in the valve port 63 of the second liquid raw material supply valve 60 and then in the V-shaped passage 26. The purge gas flowing in the V-shaped passage 26 then flows in the valve port 73 of the drain introducing valve 70, passing through the drain introducing valve 70, and then is discharged outside.

In the above way, the purge gas is allowed to directly flow in the valve ports 43, 53, and 63 which may become liquid remaining zones. Accordingly, the purge gas collides with the residual liquid staying in the valve ports 43, 53, and 63 sequentially to gradually push out the residual liquid from the valve ports 43, 53, and 63. Even where the residual liquid has large surface tension, it can be fully replaced by the purge gas. The liquid-gas replacement rate can therefore be enhanced. This makes it possible to completely remove the residual cleaning solution from the liquid raw material supply unit 10.

Figure 4:
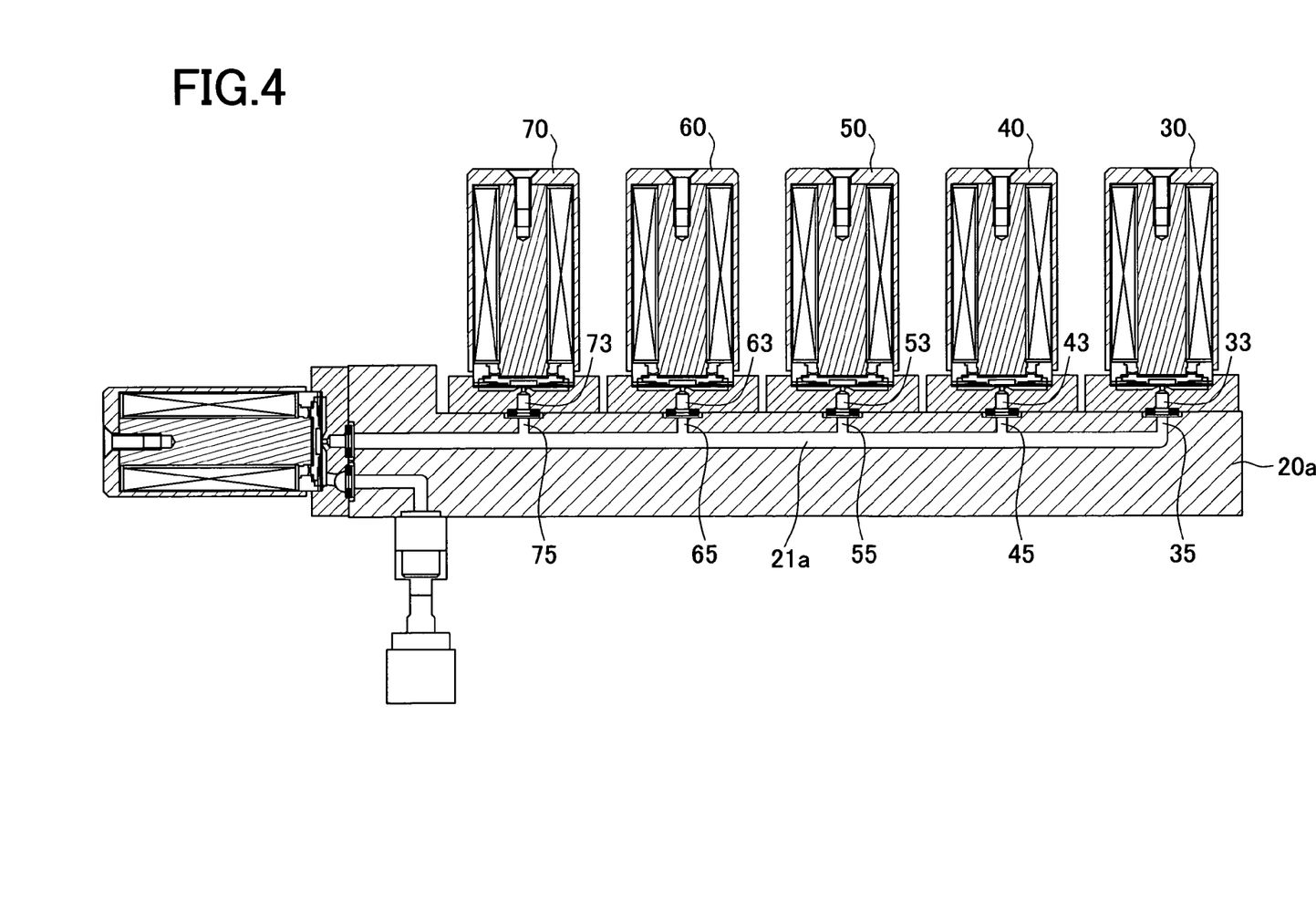
FIG. 4 is a sectional view showing a schematic configuration of a liquid raw material supply unit in a comparative example.

Here, the liquid raw material supply unit 10 of the present embodiment provided with the manifold 20 made of acrylic was checked by a residual liquid condition in each of the valve ports 43, 53, 63, and 73. As an object for comparison with the liquid raw material supply unit 10, a liquid raw material supply unit using a manifold 20a provided with a flow passage configuration as shown in FIG. 4 was similarly checked by the residual liquid condition in each of valve ports 43, 53, 63, and 73. It should be noted that the manifold 20a is formed with a main flow passage 21a extending straight in a longitudinal direction of the manifold 20a, in place of the flow passage 21 of the manifold 20, and sub-passages 35, 45, 55, 65, and 75 connecting the main flow passage 21a to the valve ports 33, 43, 53, 63, and 73 of the corresponding valves 30, 40, 50, 60, and 70.

A comparison of the replacement capability (rate) using the purge gas between the liquid raw material supply unit 10 and the liquid raw material supply unit shown in FIG. 4 obviously indicates that the liquid raw material supply unit 10 had a superior replacement capability to the liquid raw material supply unit as shown in FIG. 4. It was specifically found in the liquid raw material supply unit 10 that when the purge gas was supplied to the flow passage 21 of the manifold 20, the liquid was completely replaced by the purge gas without remaining in the valve ports 43, 53, 63, and 73 which may become dead spaces. It was conversely found in the liquid raw material supply unit shown in FIG. 4 that when the purge gas was supplied to the flow passage 21a of the manifold 20a, the liquid remained in the valve ports 43, 53, 63, and 73 which might become dead spaces and the sub-passages 35, 45, 55, 65, and 75. Thus, the liquid raw material could not be completely replaced by the purge gas.

In the liquid raw material supply unit 10 of the present embodiment as described above, the purge gas supply valve 30, the cleaning solution supply valve 40, the first liquid raw material supply valve 50, the second liquid raw material supply valve 60, and the drain introducing valve 70 are integrally mounted on the upper surface of the manifold 20, in line in that order from the upstream side of the manifold 20, and the vaporizer introducing valve 80 is further attached to the left side of the manifold 20. Thus, the miniaturization and high integration can be achieved. The valve ports 33, 43, 53, 63, and 73 of the adjacent valves among the purge gas supply valve 30, the cleaning solution supply valve 40, the first liquid raw material supply valve 50, the second liquid raw material supply valve 60, and the drain introducing valve 70 are connected by the corresponding V-shaped passages 23, 24, 25, and 26. Consequently, the liquid remaining zones may be reduced to only the valve ports 43, 53, 63, and 73 at most. In case liquid remains in those valve ports 43, 53, 63, and 73, it can be gradually pushed out sequentially by the replacement fluid (a cleaning solution or a purge gas) supplied from upstream to collide with the residual liquid. This makes it possible to enhance the replacement rate of the residual liquid by the cleaning solution or purge gas.

Figure 5:
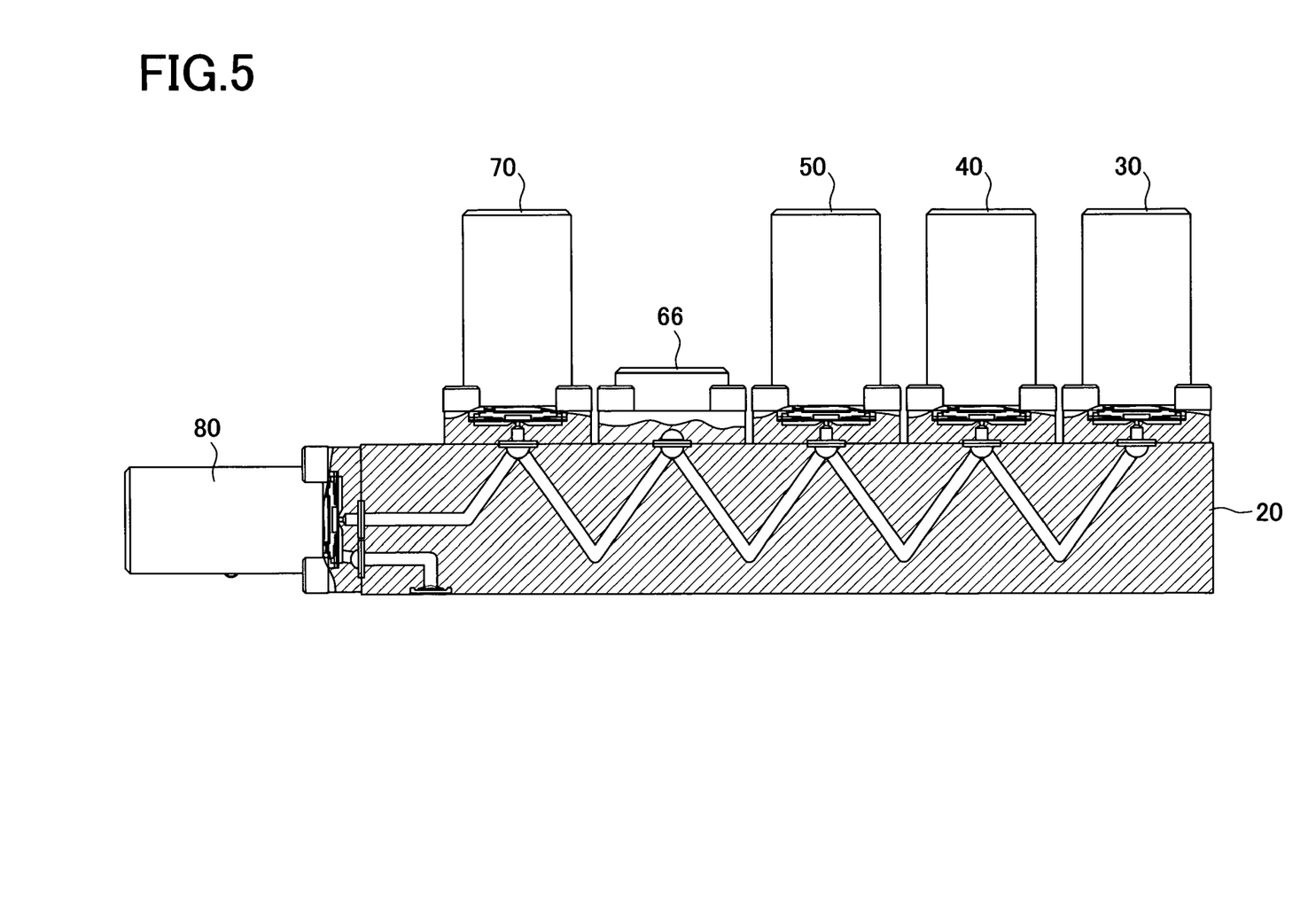
FIG. 5 is a partially sectional view showing a schematic configuration of a liquid raw material supply unit in another example.

The present invention may be embodied in other specific forms without departing from the spirit or essential characteristics thereof. For instance, the aforementioned embodiment exemplified the liquid raw material supply unit 10 with the first liquid raw material supply valve 50 and the second liquid raw material supply valve 60 both being mounted on the manifold 20 for supplying two kinds of liquid raw materials. As an alternative, a unit may be arranged to supply a single kind of a liquid raw material shown in FIG. 5, in which the first liquid raw material supply valve 50 is mounted on the manifold 20, and a passage block 66 is mounted instead of the second liquid raw material supply valve 60 on the manifold 20.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A liquid raw material supply unit for a vaporizer, adapted to supply a liquid raw material to the vaporizer that vaporizes the liquid raw material, the unit comprising:
    a manifold internally formed with a flow passage; and
    a plurality of fluid control valves mounted on the manifold,
    wherein the plurality of fluid control valves includes:
        a liquid raw material control valve for controlling supply of the liquid raw material to the flow passage;
        a cleaning solution control valve for controlling supply of a cleaning solution to the flow passage;
        a purge gas control valve for controlling supply of a purge gas to the flow passage; and
        a first introducing control valve connectable to the vaporizer for controlling supply of a fluid from the flow passage to the vaporizer,
    the purge gas control valve, the cleaning solution control valve, the liquid raw material control valve, and the first introducing control valve being mounted on the manifold in this order from an upstream side of the manifold,
    wherein the flow passage is connected to valve ports of the plurality of control valves respectively, the valve ports communicating with valve openings of the respective control valves, and
    the flow passage is configured to allow the purge gas supplied from the purge gas control valve to directly flow in the valve ports of the cleaning solution control valve and the liquid raw material control valve placed downstream from the purge gas control valve.

2. The liquid raw material supply unit for a vaporizer according to claim 1, wherein the flow passage is formed in V-shape having open ends for connecting adjacent valves of the purge gas control valve, the cleaning solution control valve, and the liquid raw material control valve so that the flow passage is connected to each valve port at each open end serving as a joint portion between the adjacent V-shaped passages.

3. The liquid raw material supply unit for a vaporizer according to claim 1, wherein the plurality of fluid control valves further include a second introducing control valve connectable to a drain for controlling supply of the fluid from the flow passage to the drain, and the second introducing valve is mounted on the manifold at a position downstream from the liquid raw material control valve and upstream from the first introducing control valve.

4. The liquid raw material supply unit for a vaporizer according to claim 1, wherein the purge gas control valve, the cleaning solution control valve, and the liquid raw material control valve are mounted in line on an upper surface of the manifold.

5. The liquid raw material supply unit for a vaporizer according to claim 1, wherein the liquid raw material includes at least one of strontium and titanium.

6. The liquid raw material supply unit for a vaporizer according to claim 2, wherein the joint portion between the V-shaped passages opens on an upper surface of the manifold.

7. The liquid raw material supply unit for a vaporizer according to claim 3, wherein the purge gas control valve, the cleaning solution control valve, the liquid raw material control valve, and the drain introducing control valve are mounted in line on an upper surface of the manifold.

* * * * *